Patented Apr. 12, 1949

2,467,362

UNITED STATES PATENT OFFICE 2,467,362

CALKING COMPOSITION

Russell Harry Taylor, Sydney, New South Wales, Australia, assignor to Joseph E. Berman, Suffolk, Va., and R. C. Robinson, Seattle, Wash.

No Drawing. Application July 26, 1946, Serial No. 686,459

5 Claims. (Cl. 260—755)

This invention deals with calking compositions.

It is an object of this invention to provide calking materials which are water-proof.

It is an object of this invention to provide calking materials which are resistant to chemicals, including acids and salt water.

It is an object of this invention to provide calking materials which are resistant to marine-borers.

It is another object of this invention to provide calking materials which are extremely durable.

It is still another object of this invention to provide calking materials that adhere excellently to all kinds of materials without requiring a pretreating, in particular a roughening, process.

It is still another object of this invention to provide calking materials which have an unusually high degree of flexibility and which, when applied in intermediate layers, exert a cushioning effect and thereby reduce damaging of the articles provided with said adhesive.

These and other objects are accomplished by thoroughly mixing oil-reclaimed rubber, zinc oxide, resin, Agerite powder, which is phenyl-beta-naphthylamine, bitumen, an anti-oxidant and a solvent.

The following example is characteristic for the compound of my invention:

EXAMPLE

Batch A

| | Pounds |
|---|---|
| Oil-reclaimed rubber | 200 |
| Zinc oxide | 100 |

Batch B

| | Pounds |
|---|---|
| Colophony | 200 |
| Agerite powder | 2.75 |

The ingredients of batch A and batch B may be mixed in any mixing device known in the art. The mixture obtained from batch A is sheeted off the mill approximately ⅛" thick and then, together with batch B, dissolved in approximately 60 gallons of benzol. Mixing of the batches with the solvent is continued until a homogeneous product is obtained; this takes approximately 24 hours. The product thus obtained is the bonding base of the product of my invention.

Batch C

Thereafter approximately 2800 lbs. of bitumen together with about 760 lbs. of colophony are melted, whereupon 50 lbs. of Flectol B, an antioxidant obtained by condensation of acetone and aniline, are added while stirring the batch. Then about 400 lbs. of zinc oxide are admixed and finally 1040 lbs. of the above-specified bonding base added.

My invention is not limited to the foregoing example, but the proportions may be varied within certain ranges. Thus, from 150 to 250 lbs. of rubber may be mixed with about 70 to 130 lbs. of zinc oxide, and likewise, 2.75 lbs. of Agerite powder may be added to a quantity of approximately from 150 lbs. to 250 lbs. of colophony. The quantity of solvent may range from 20 to 120 gallons. Likewise, the quantity of bitumen may range from 2000 to 4000 lbs., that of colophony added in the second step from 700 to 850 lbs., that of Flectol B from 30 to 75 lbs. and that of the last addition of zinc oxide from 300 to 600 lbs.

The procedure of manufacture is also not obligatory; the ingredients may be mixed in any other manner and in a sequence different from that used in the above example.

The product of my invention may be used for repairing leakages and other defects, for protective coatings, for packings and washers, for puttying, for water-proofing and for many other purposes. It has adhesive and bonding properties with regard to practically any material conceivable; thus, it may be used for bonding or treating rubber, sponge, textile materials, felts, hair, sisal, coir, linoleum, construction materials such as bricks, tiles, stone, cement, metals, wood, leather, glass, plastics, Celluloid, cord, malthoid and a great number of other materials.

The composition may be used by itself, or filler materials may be incorporated therein. Thus, for example rubber buffings, sand, ground asbestos, powdered glass, powdered mica, ground cork, wood dust and similar disintegrated filling materials are suitable for incorporation into the adhesive of my invention. If greater quantities of such filler materials are added, it is mostly advisable to employ a greater quantity of solvent in order to facilitate mixing of the ingredients and application to the materials to be treated.

In using the calking product of the example, it is advantageous to heat it to a temperature of from 200 to 220° F. before pouring it on the articles to be treated or applying by any other means.

The products of my invention have been used for the most diversified purposes. One of the most important and frequent applications has been for treating construction materials; there it has been employed for bonding the various materials, and for wind-proofing and water-proofing windows, doors or the like. For roofs it has also been used with success either as a covering material proper or for bonding plates of various materials to the roof. It has furthermore been used for sealing gutters. The composition has also proved helpful in repairing rafts and canvas hinges of folding boats. Its acid proof property makes it valuable for chemical laboratories and in chemical plants for application to walls, floors, ceilings, etc. of the building or for the equipment thereof. My composition has furthermore been found useful for laminating ply wood. The glass industry has successfully employed my material for bonding mirrors to a base plate. In combination with powdered glass or mica the composition of my invention has been found suitable for filling gaps in high voltage windings. When compounded with rubber buffings, it yields an excellent non-slip coat for pedals or the like. When thinned with benzene or benzol it is a most satisfactory water-proofing agent for textiles, paper, wood and other like materials.

The above applications are only a few examples of the many diversified uses of my material.

It will be understood that while there have been described herein specific embodiments of my invention, it is not intended thereby to have it limited to or circumscribed by the details given, since my invention is susceptible to many changes and modifications which come within the spirit of the description and the scope of the appended claims.

I claim:

1. As a new composition of matter, a mixture consisting of from 150 to 250 pounds of oil-reclaimed rubber, from 370 to 730 pounds of zinc oxide, from 850 to 1100 pounds of colophony, approximately 2.75 pounds of phenyl-betanaphthylamine, from 2000 to 4000 pounds of bitumen; from 30 to 75 pounds of acetone-aniline condensation product; and from 20 to 120 gallons of solvent.

2. As a new composition of matter, a mixture consisting of approximately 200 pounds of oil-reclaimed rubber, 500 pounds of zinc oxide, 960 pounds of colophony, 2.75 pounds of phenyl-beta-naphthylamine, 2800 pounds of bitumen, 50 pounds of acetone-aniline condensation product, and 60 gallons of benzol.

3. As a new article of manufacture, a calking composition consisting of approximately 200 pounds of oil-reclaimed rubber, 500 pounds of zinc oxide, 960 pounds of colophony, 2.75 pounds of phenyl-beta-naphthylamine, 2800 pounds of bitumen, 50 pounds of acetone-aniline condensation product, and 60 gallons of benzol.

4. A calking composition consisting of from 150 to 250 lbs. of oil-reclaimed rubber, from 370 to 730 lbs. of zinc oxide, from 850 to 1100 lbs. of colophony, approximately 2.75 lbs. of phenyl-beta-naphthylamine, from 2,000 to 4,000 lbs. of bitumen, from 30 to 75 lbs. of acetone-aniline condensation product, from 20 to 120 gallons of solvent, and filler material selected from the group consisting of rubber buffings, sand, ground asbestos, powdered glass, powdered mica, ground cork and wood dust.

5. A calking composition consisting of approximately 200 lbs. of oil-reclaimed rubber, 500 lbs. of zinc oxide, 960 lbs. of colophony, 2.75 lbs. of phenyl-beta-naphthylamine, 2,800 lbs. of bitumen, 50 lbs. of acetone-aniline condensation product, 60 gallons of benzol and filler material selected from the group consisting of rubber buffings, sand, ground asbestos, powdered glass, powdered mica, ground cork and wood dust.

RUSSELL HARRY TAYLOR.

REFERENCES CITED

The following references are of record in the file of this patent:

UNITED STATES PATENTS

| Number | Name | Date |
|---|---|---|
| 319,079 | Ellis | June 2, 1885 |
| 2,166,236 | Crawford | July 18, 1939 |
| 2,210,348 | Swope | Aug. 6, 1940 |
| 2,265,770 | Crawford | Dec. 9, 1941 |
| 2,347,211 | Merrill et al. | Apr. 25, 1944 |